Patented Jan. 29, 1929.

1,700,657

UNITED STATES PATENT OFFICE.

AUGUST TREUSCH, OF OFFENBACH-ON-THE-MAIN, AND RICHARD WÜRTENBERGER, OF DARMSTADT, GERMANY, ASSIGNORS TO THE FIRM J. MAYER & SOHN, OF OFFENBACH-ON-THE-MAIN, GERMANY.

PROCESS FOR RECOVERING CHROMIUM FROM CHROMIFEROUS WASTE MATERIALS.

No Drawing. Application filed June 1, 1925, Serial No. 34,197, and in Germany June 16, 1924.

This invention concerns a process for the recovery of chromium as chromate from chromiferous waste materials resulting from the leather industry such as chrome-leather parings.

The process consists in first converting the chromium of the chromiferous waste materials into an insoluble or sparingly soluble chromate. In the case of waste chrome-leather parings this is effected by subjecting the same to an oxidizing treatment. The insoluble or sparingly soluble chromate is separated and then reacted with an acid salt or a normal salt in conjunction with an acid, which salt or salt-acid mixture will enable the chromium to go into solution again as chromate while the anions of the salt form with the metallic radicle of the insoluble chromate an insoluble or sparingly soluble compound. In this manner the chromium may be recovered in a highly concentrated form, while the soluble matters separated from the insoluble chromate can be utilized more effectively owing to the fact that they are free from or practically free from chromium.

In the case of chrome-leather parings the trivalent chromium is transformed by oxidation into hexavalent chromium and a complete separation of the chromium from the hide substance is rendered possible. This result cannot be attained with the known processes for the recovery of chromium, without excessive decomposition of the hide substance and impairing the character of the recovered glue. A point of particular importance is that, by means of the present process, the glue-forming substance and the amounts of chromium used in the tanning process are recovered simultaneously, the latter being recovered direct in such a form that it can at once find application as a chroming bath in the two-bath process.

The following example will serve to illustrate how the invention can be carried into practice, but the invention is not restricted to such example:

Waste chrome trimmings from leather manufacture are de-chromed, preferably with barium peroxide, in an autoclave at 60° C. The resulting barium sulphate and barium chromate in the glue liquor so obtained are allowed to settle down, the supernatant liquor being separated from the sediment, and the latter treated with the calculated quantity of the salt intended for reaction (sodium sulphate, sodium bisulphate, sodium sulphate and sulphuric acid, or sodium sulphate and hydrochloric acid, whichever be desired). In this manner a chromate liquor is obtained which can be separated from the sediment. The glue liquor coming from the autoclave may be worked up—either in a neutral or faintly acid condition—into usable glue by the usual methods. Other salts, such as those of lead and strontium, can also be used for obtaining chromate precipitates, but their cost rather militates against them.

What we claim is:—

1. A process for the recovery of chromium as chromate from chromiferous waste materials resulting from the leather industry, comprising the steps of subjecting the waste material to treatment to convert any chromium therein not in the form of chromate into an insoluble chromate, separating the insoluble chromate, and then reacting on said insoluble chromate so as to liberate a soluble chromate.

2. A process for the recovery of chromium as chromate from chromiferous waste materials resulting from the leather industry, comprising the steps of subjecting the waste material to a treatment involving oxidation of any chromium not in the form of chromate to that form and precipitation in the form of an insoluble chromate, separating the insoluble chromate, and then reacting on said insoluble chromate so as to liberate a soluble chromate.

3. A process for the recovery of chromium as chromate from chromiferous waste materials resulting from the leather industry, comprising the steps of subjecting the waste material to treatment with a soluble barium compound to form an insoluble barium chromate, and then reacting on the barium chromate with an acid salt of an alkali metal that will form an alkali metal chromate solution and will precipitate a sparingly soluble barium salt.

4. A process for recovering chromium from waste chrome leather, comprising the steps of dechroming the waste leather with barium peroxide under pressure in an autoclave, separating the precipitated barium chromate and barium sulphate thereby obtained from the solution, and treating such precipitate with a solution of an acid salt of an alkali metal that will form an alkali metal chromate solution and will precipitate a sparingly soluble barium salt.

5. A process for the recovery of chromium as chromate from chromiferous waste materials resulting from the leather industry, comprising the steps of subjecting the waste material to a treatment involving oxidation of any chromium not in the form of chromate to that form and precipitation in the form of a sparingly-soluble chromate, and bringing the precipitated chromate into reaction with salts whose anions form therewith salts which are still more sparingly soluble than such chromate.

In testimony whereof we affix our signatures.

AUGUST TREUSCH.
RICHARD WÜRTENBERGER.